US008135690B2

(12) United States Patent
Eidt et al.

(10) Patent No.: US 8,135,690 B2
(45) Date of Patent: Mar. 13, 2012

(54) CONCURRENCY OBJECT CLASSIFICATION

(75) Inventors: Carol Eidt, Campbell, CA (US); Roger Lawrence, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 12/348,617

(22) Filed: Jan. 5, 2009

(65) Prior Publication Data
US 2010/0174711 A1 Jul. 8, 2010

(51) Int. Cl.
*G06F 7/00* (2006.01)
*G06F 17/00* (2006.01)
(52) U.S. Cl. ........................................... 707/704
(58) Field of Classification Search .................. None
See application file for complete search history.

(56) References Cited

U.S. PATENT DOCUMENTS

| 6,587,955 | B1 | 7/2003 | Foote et al. | |
|---|---|---|---|---|
| 6,832,367 | B1 | 12/2004 | Choi et al. | |
| 7,210,105 | B2 | 4/2007 | Melamed et al. | |
| 7,231,498 | B2 | 6/2007 | Rodeheffer et al. | |
| 2002/0188651 | A1* | 12/2002 | Choi et al. | 709/107 |
| 2005/0102681 | A1* | 5/2005 | Richardson | 719/321 |
| 2005/0216798 | A1 | 9/2005 | Yu | |
| 2006/0200823 | A1 | 9/2006 | Rodeheffer et al. | |
| 2006/0206865 | A1 | 9/2006 | Reinhardt et al. | |
| 2007/0192550 | A1 | 8/2007 | Rodeheffer et al. | |
| 2008/0005742 | A1 | 1/2008 | Ma | |
| 2008/0109641 | A1 | 5/2008 | Ball et al. | |
| 2008/0163174 | A1 | 7/2008 | Krauss | |
| 2008/0201393 | A1 | 8/2008 | Krauss | |
| 2009/0248689 | A1* | 10/2009 | Petersen et al. | 707/7 |

OTHER PUBLICATIONS

G. Hunt et al., "Detours: Binary Interception of Win32 Functions"; available at http://research.microsoft.com/sn/detours; dated Jul. 1999; 9 pgs.
Stoller, Scott D., "Model-Checking Multi-Threaded Distributed Java Programs", Retrieved at <<http://www.cs.sunysb.edu/~stoller/papers/SPIN2000-STTT.pdf>>, pp. 1-20.
Yu, et al., "RaceTrack: Efficient Detection of Data Race Conditions via Adaptive Tracking", Retrieved at <<http://www.cs.berkeley.edu/~wychen/papers/sosp05.pdf>>, SOSP'05, Oct. 23-26, 2005, pp. 14.
Tian, et al., "Dynamic Recognition of Synchronization Operations for Improved Data Race Detection", Retrieved at <<http://delivery.acm.org/10.1145/1400000/1390649/p143-tian.pdf?>>, ISSTA'08, Jul. 20-24, 2008, pp. 143-153.

* cited by examiner

*Primary Examiner* — Uyen T. Le
(74) *Attorney, Agent, or Firm* — Dicke, Billig & Czaja, PLLC

(57) ABSTRACT

A method of automatically classifying a concurrency object includes intercepting a call that is configured to create the concurrency object. Concurrency type information for the concurrency object is identified based on the call. The type information indicates whether the concurrency object is a lock object or a synchronization object. The concurrency type information is associated with the concurrency object.

20 Claims, 4 Drawing Sheets

CONCURRENCY OBJECT CLASSIFICATION

BACKGROUND

A large number of applications today are multi-threaded. Multi-threading allows the execution of a particular application or program to be divided into two or more separate threads. Each of these threads may then be executed in parallel on a multi-processor, or multi-core system. However, the use of multi-threading in multi-processor or multi-core settings increases the possibility and probability of concurrency errors, such as race conditions.

In a multithreaded program, a data race condition occurs when a shared memory location is accessed by two or more concurrent threads, with at least one of the accesses being a write, without proper synchronization to constrain the ordering of the accesses. The effects of the execution in such a case depend on the particular order in which the accesses take place. Race conditions often result in unexpected and undesirable program behavior, such as program crashes or incorrect results.

Some data race detection solutions monitor lock acquisition, synchronization operations, and memory accesses, computing an access pattern for each memory location and memory access. These solutions then analyze the access to memory location patterns to detect suspicious access patterns that may indicate a potential data race. An access pattern may be considered to be "suspicious" if a memory location is shared among multiple threads without a common lock that may be used by individual threads/programs to govern access to the memory locations.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

It is useful for a race detection algorithm to know the kind or type of concurrency (e.g., locking versus synchronization) of a concurrency object. In some cases, the type of concurrency may be determined based on the specific application programming interface (API) being invoked, but in cases where the same API is used for both of these kinds of concurrency, the determination of the kind of concurrency can be more difficult.

One embodiment automatically classifies concurrency objects for a race detection process. In one embodiment, the classification of a concurrency object includes intercepting an API call that creates the concurrency object. Concurrency type information for the concurrency object is identified based on the call. The type information indicates whether the concurrency object is a lock object or a synchronization object. The concurrency type information is associated with the concurrency object. A race detection process is performed using the concurrency type information.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
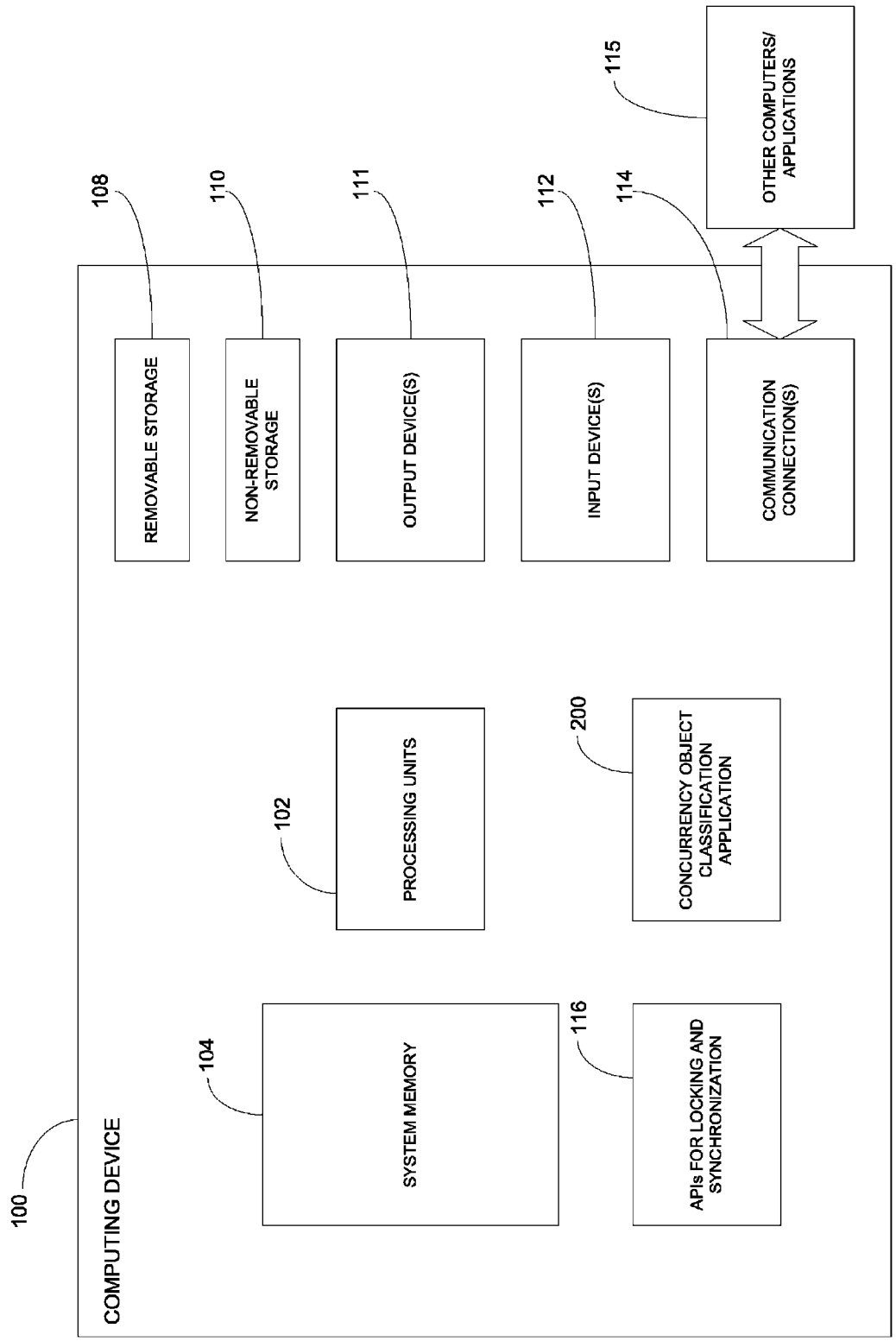
FIG. 1 is a diagram illustrating a computing system suitable for performing concurrency object classification according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that classifies concurrency objects, but the technologies and techniques described herein also serve other purposes in addition to these.

A "concurrency object" according to one embodiment refers to any object that is used to control concurrent executions, including lock objects and synchronization objects. A "synchronization object" according to one embodiment refers to an object that is used to enforce an ordering relationship between two execution contexts (e.g., threads). Examples of synchronization objects according to one embodiment are thread handles, condition variables, timers, and events (e.g., CreateThread, CreateSemaphore, CreateEvent, WakeConditionVariable, SetEvent, SetWaitableTimer). A "lock object" according to one embodiment refers to an object that is used to enforce a locking protocol, without a specific ordering constraint (i.e., the lock may be acquired/released in arbitrary order by the execution contexts). Examples of lock objects according to one embodiment are Mutex and CriticalSection (e.g., EnterCriticalSection and AcquireSRWLock are API invocations for acquiring a lock; and LeaveCriticalSection, ReleaseMutex, SleepConditionVariableCS, ReleaseSRWLock are API invocations for releasing a lock).

As mentioned above, in some cases, the specific API being invoked is sufficient to determine the kind or type of concurrency (e.g., locking versus synchronization), but in cases where the same API is used for both of these kinds of concurrency, the determination of the kind of concurrency can be more difficult. For example, a Wait API (e.g., WaitForSingleObject or WaitForMultipleObjects) may be used either to acquire a lock or to synchronize, and in the API, there is not a way to tell which one it is. When a Wait API is called, a handle to the concurrency object being waited on is provided. However, in the Windows operating system, the handle is opaque, so it cannot be determined from the handle whether the concurrency object is a lock object or synchronization object. The Wait API can map to a lock acquire when the object is a lock, or can establish a "happens before" relationship when the object is a synchronization object such as a thread. A "happens before" relationship is characterized by a synchronization event indicating an ordering between threads. Thus, the Wait API may be considered to be an "ambiguous" Wait, since the type of concurrency for the Wait cannot be determined from the API.

One embodiment intercepts API calls that create concurrency objects and records, per object, concurrency object type information indicating whether the object is a synchronization object or a lock object, thereby classifying concurrency objects into two types. In one embodiment, the type of a concurrency object (e.g., synchronization or lock) is determined based on the API call used to create the object. In one embodiment, a shadow heap is used to store usage information for concurrency objects, and is also used to store the concurrency object type information. In one embodiment, each object being tracked has at least one associated 32-bit word of shadow memory, and two bits of this word are used to indicate the concurrency object type of the object.

When an ambiguous reference is later made to a concurrency object, such as waiting on the object using a Wait API call that does not identify whether the concurrency object is a synchronization object or a lock object, the recorded type information allows the system to distinguish between synchronization and lock objects. In the case where the ambiguous call is made before the recording of the type information, the object is assumed to be a lock object in one embodiment. This may happen in two cases: 1) If the developer is using a function pointer to call the creation API, the interception may not occur; or 2) if a new synchronization object creation API is introduced, the interception may not occur.

In one embodiment, a monitoring dynamic link library (DLL) is attached to the application being examined. When that DLL is loaded into a thread context, the Windows concurrency API's are intercepted to custom versions of those routines so that any usage made of the API's by routines on the thread can be examined. These custom routines take the appropriate action for the concurrency object that is either being created or passed. When the API being invoked creates a concurrency object of a specific type (e.g., synchronization or lock) that information is recorded, and associated with the address of the object. In one embodiment, when the API maps unambiguously to a lock acquire/release semantic, the object type is a lock; otherwise the recorded type is used to make that discrimination.

FIG. 1 is a diagram illustrating a multi-processor computing device 100 suitable for performing concurrency object classification according to one embodiment. In the illustrated embodiment, the computing system or computing device 100 includes a plurality of processing units (e.g., processors) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes APIs for locking and synchronization 116, and concurrency object classification application 200. In one embodiment, APIs 116 include logic for waiting on concurrency objects. Concurrency object classification application 200 is described in further detail below with reference to FIG. 2.

Figure 2:
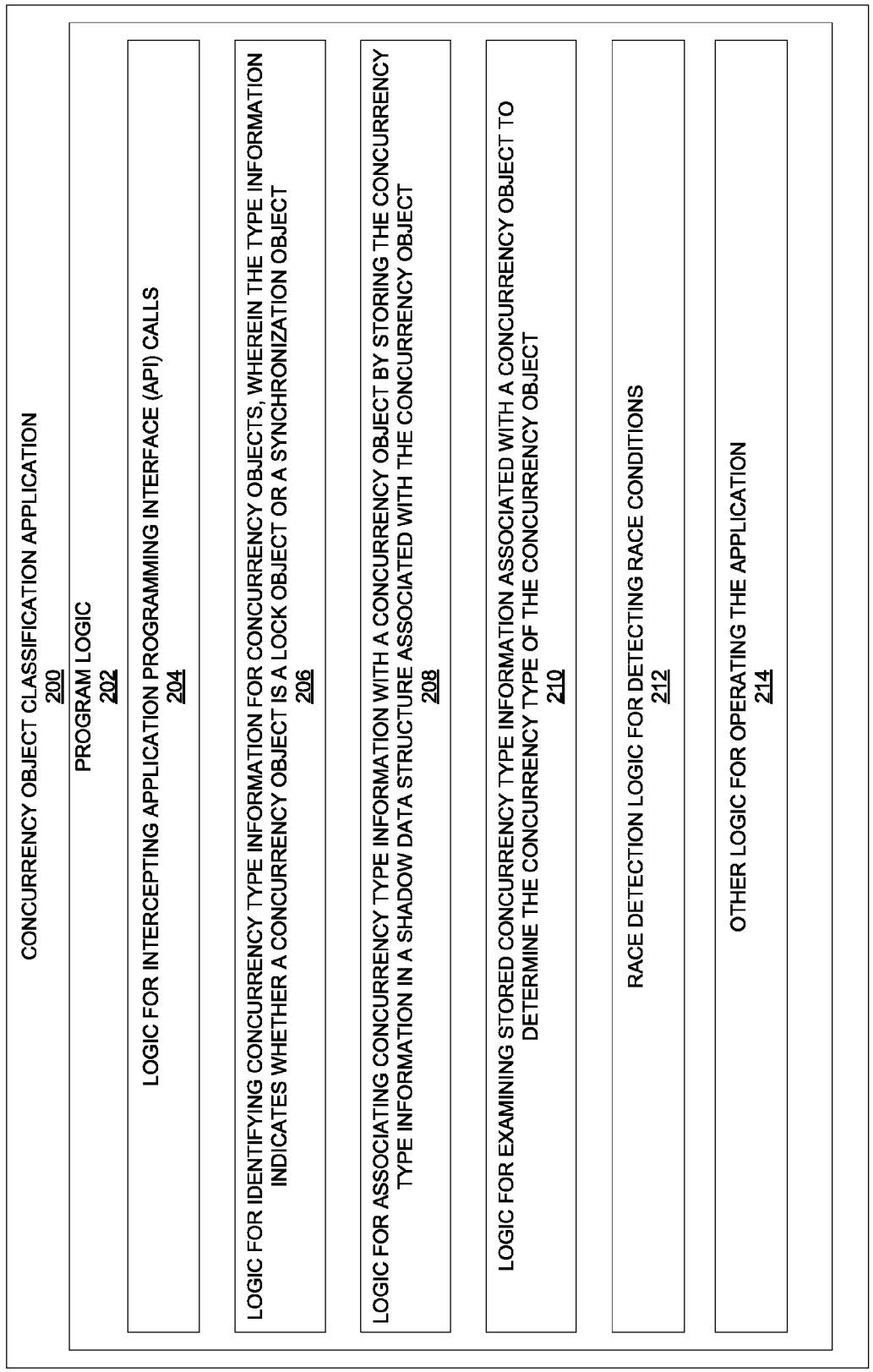
FIG. 2 is a diagrammatic view of a concurrency object classification application for operation on the computer system illustrated in FIG. 1 according to one embodiment.

FIG. 2 is a diagrammatic view of one embodiment of a concurrency object classification application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Concurrency object classification application 200 includes program logic 202, which is responsible for carrying out some or all of the techniques described herein. Program logic 202 includes logic 204 for intercepting application programming interface (API) calls; logic 206 for identifying concurrency type information for concurrency objects, wherein the type information indicates whether a concurrency object is a lock object or a synchronization object; logic 208 for associating concurrency type information with a concurrency object by storing the concurrency type information in a shadow data structure associated with the concurrency object; logic 210 for examining stored concurrency type information associated with a concurrency object to determine the concurrency type of the concurrency object; race detection logic 212 for detecting race conditions; and other logic 214 for operating the application.

Figure 3:
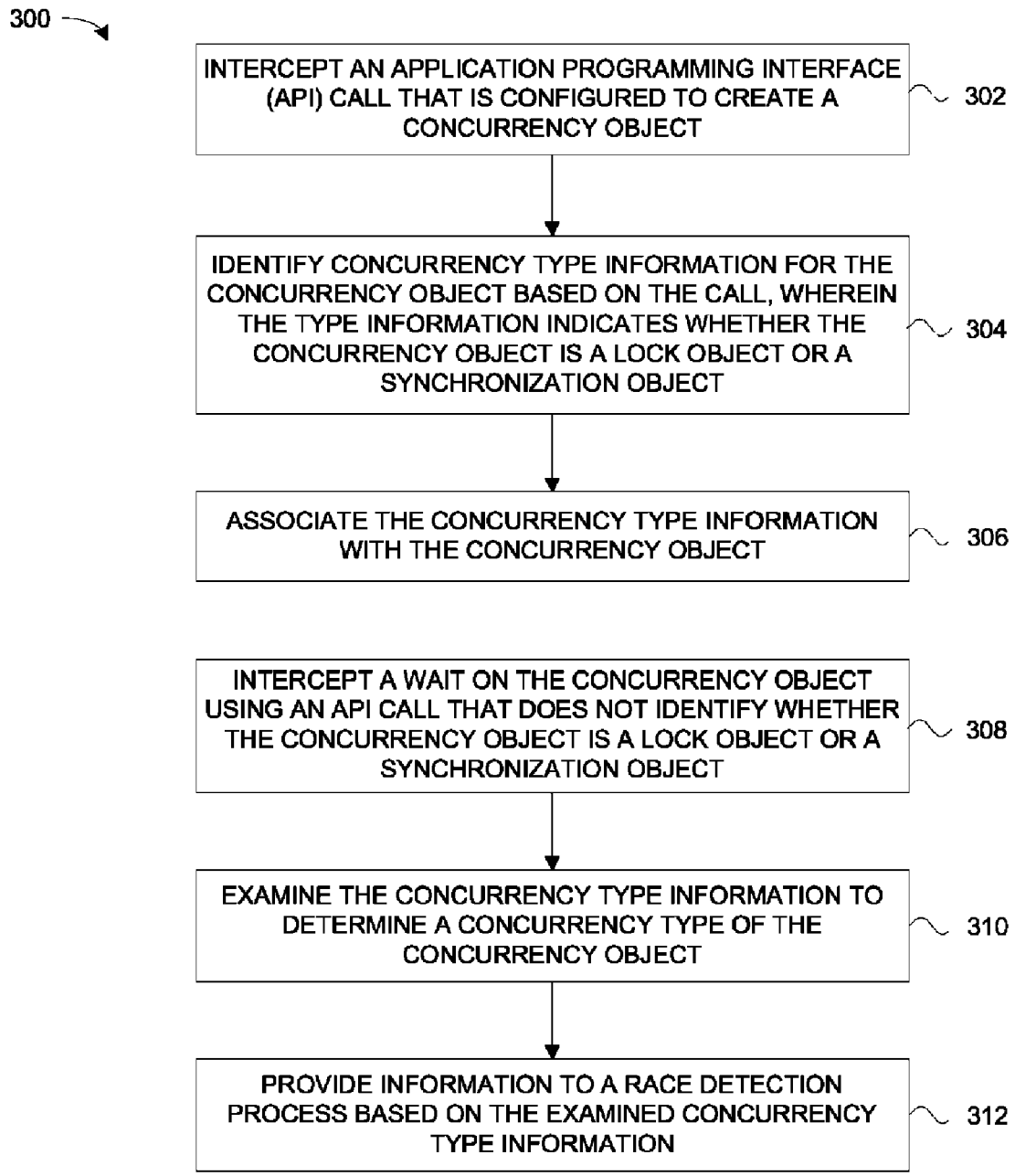
FIG. 3 is a flow diagram illustrating a method of automatically classifying a concurrency object according to one embodiment.
Figure 4:
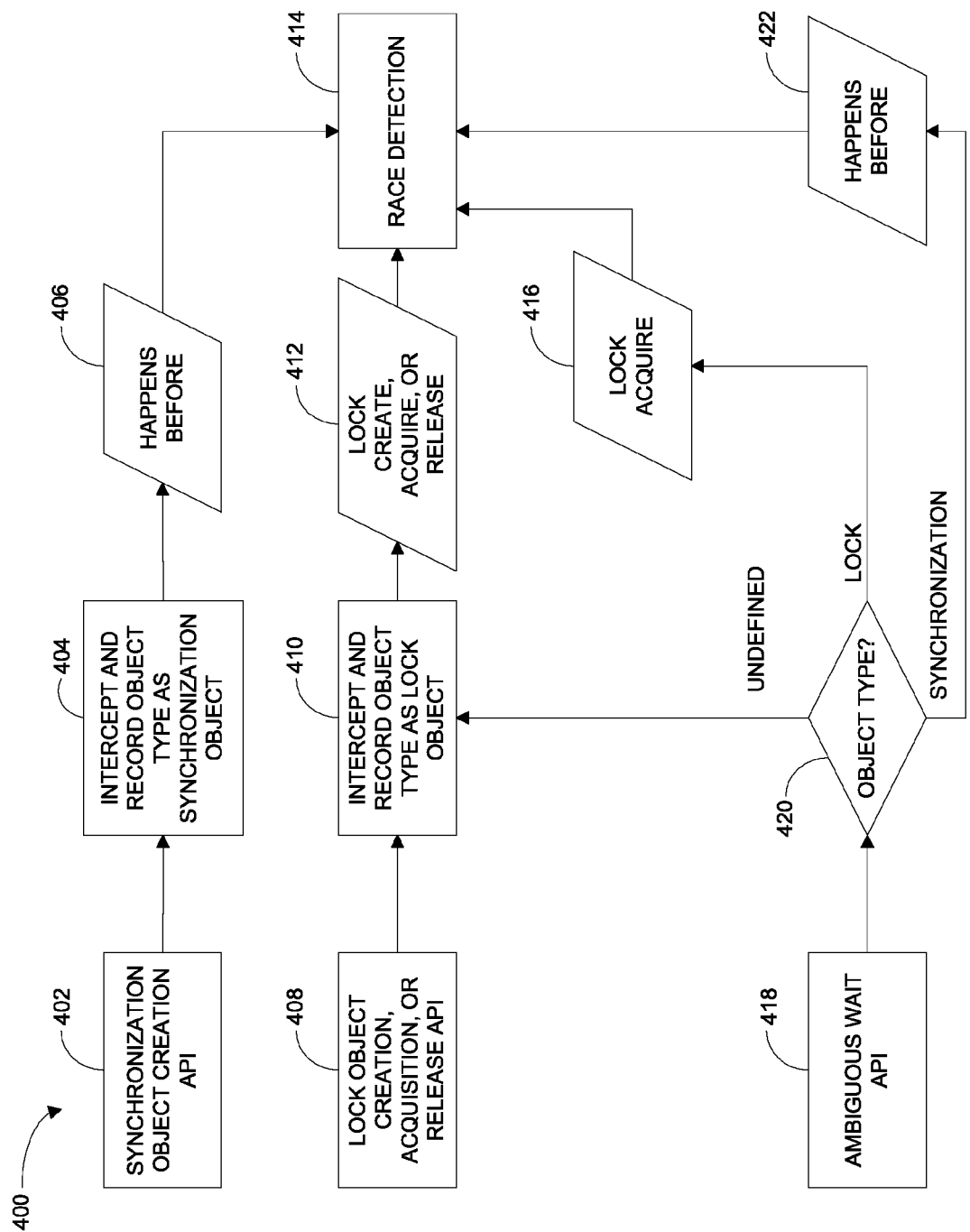
FIG. 4 is a flow diagram illustrating a method of automatically classifying a concurrency object according to another embodiment.

Turning now to FIGS. 3 and 4, techniques for implementing one or more embodiments of concurrency object classification application 200 are described in further detail. In some implementations, the techniques illustrated in FIGS. 3 and 4 are at least partially implemented in the operating logic of computing device 100.

FIG. 3 is a flow diagram illustrating a method 300 of automatically classifying a concurrency object according to one embodiment. In one embodiment, the classification in method 300 is performed for a race detection process. At 302 in method 300, an application programming interface (API) call that is configured to create the concurrency object is intercepted. At 304, concurrency type information for the concurrency object is identified based on the call, wherein the type information indicates whether the concurrency object is a lock object or a synchronization object. At 306, the concurrency type information is associated with the concurrency object. At 308, a Wait on the concurrency object is performed using an API call that does not identify whether the concurrency object is a lock object or a synchronization object. At 310, the concurrency type information is examined to determine a concurrency type of the concurrency object. At 312, information is provided to a race detection process based on the examined concurrency type information.

In one embodiment, the concurrency object in method 300 is configured to control concurrent executions. In one embodiment of method 300, an indication that the concurrency object is a lock object indicates that the concurrency object is configured to enforce a locking protocol without a specific ordering constraint, and an indication that the concurrency object is a synchronization object indicates that the concurrency object is configured to enforce an ordering relationship between two execution contexts.

In one embodiment of method 300, the concurrency type information is associated with the concurrency object at 306 by storing the concurrency type information in a shadow data structure associated with the concurrency object. In one embodiment, the shadow data structure comprises a 32-bit shadow data word that includes usage information for the concurrency object, and wherein the concurrency type information is represented by two or less bits of the shadow data word.

FIG. 4 is a flow diagram illustrating a method 400 for automatically classifying a concurrency object according to another embodiment. FIG. 4 illustrates the classification that takes place according to the API that is being intercepted, and in each case a race detection algorithm 414 is invoked with the appropriate action that corresponds to the API, after the concurrent object type classification is performed.

At 402 in method 400, a synchronization object creation API is called to create a concurrency object of the synchronization type. At 404, the API call at 402 is intercepted, and the object type is recorded as a synchronization type object. In one embodiment, the object type is stored in a shadow data word associated with the object. At 406, the object is identified as a "happens before" event, and this information is provided to race detection algorithm 414. In one embodiment, the race detection algorithm 414 is a Microsoft Race-Track™ application from Microsoft Corporation, which uses a hybrid version of lockset and threadset algorithms to detect potential race conditions. In one embodiment, the race detection algorithm 414 detects concurrent accesses and identifies potential race conditions. An object is identified as being involved in a race in one embodiment if there is no happens before relationship, and there is no common lock. In one embodiment, concurrent references to a shared memory location will trigger a race condition unless one of the following conditions holds: (1) the memory location is protected by a lock object; or (2) the sequence of accesses from each of the threads is deterministically ordered (i.e., synchronized).

At 408, a lock object creation, acquisition, or release API is called to create, acquire, or release a concurrency object of the lock type. At 410, the API call at 408 is intercepted, and the object type is recorded as a lock type object. In one embodiment, the object type is stored in a shadow data word associated with the object. At 412, the object is identified as a lock create, acquire, or release event, and this information is provided to race detection algorithm 414.

At 418, an "ambiguous" Wait API is called to wait on a concurrency object. The Wait API at 418 is referred to as "ambiguous" according to one embodiment because the type of concurrency (e.g., synchronization versus lock) for the Wait cannot be determined from the Wait API. At 420, based on the information recorded at 404 or 410, it is determined whether the object type of the concurrency object to be waited on is a lock type object, a synchronization type object, or an undefined type object (i.e., no type information has been recorded for the object). If it is determined at 420 that the concurrency object is an undefined type object, the object type is assumed to be a lock and is recorded at 410 as a lock type object. The object is identified as a lock acquire event at 412, and this information is provided to race detection algorithm 414.

If it is determined at 420 that the concurrency object is a lock object, the object is identified as a lock acquire event at 416, and this information is provided to race detection algorithm 414. If it is determined at 420 that the concurrency object is a synchronization object, the object is identified as a "happens before" event at 422, and this information is provided to race detection algorithm 414.

The techniques described above may be applied to any set of concurrency-related APIs where there is at least one ambiguous API, but where there is sufficient information in the sequence of API invocation to deduce the concurrency type. For example, in some operating system or runtime there may be a single API for creating a concurrency object, and then its first usage (e.g., acquire, post, wait, etc) provides the disambiguation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of automatically classifying a concurrency object, comprising:
    intercepting a call that is configured to create the concurrency object;
    identifying concurrency type information for the concurrency object based on the call, the type information indicating whether the concurrency object is a lock object or a synchronization object;
    associating the concurrency type information with the concurrency object; and
    wherein the intercepting, identifying, and associating are performed by at least one processor.

2. The method of claim 1, wherein the call is an application programming interface (API) call.

3. The method of claim 1, wherein the concurrency object is configured to control concurrent executions.

4. The method of claim 1, wherein an indication that the concurrency object is a lock object indicates that the concurrency object is configured to enforce a locking protocol without a specific ordering constraint.

5. The method of claim 1, wherein an indication that the concurrency object is a synchronization object indicates that the concurrency object is configured to enforce an ordering relationship between two execution contexts.

6. The method of claim 1, and further comprising:
    performing a race detection process using the concurrency type information.

7. The method of claim 1, and further comprising:
    performing a wait on the concurrency object using an API call that does not identify whether the concurrency object is a lock object or a synchronization object.

8. The method of claim 7, and further comprising:
examining the concurrency type information to determine a concurrency type of the concurrency object; and
providing information to a race detection process based on the examined concurrency type information.

9. The method of claim 1, wherein the concurrency type information is associated with the concurrency object by storing the concurrency type information in a shadow data structure associated with the concurrency object.

10. The method of claim 9, wherein the shadow data structure comprises a 32-bit shadow data word.

11. The method of claim 10, wherein the concurrency type information is represented by two or less bits of the shadow data word.

12. The method of claim 11, wherein the shadow data word includes usage information for the concurrency object.

13. A computer-readable storage medium storing computer-executable instructions for performing a method of automatically classifying a concurrency object, comprising:
intercepting an application programming interface (API) call that is configured to create the concurrency object;
identifying concurrency type information for the concurrency object based on the call, the type information indicating whether the concurrency object is a lock object or a synchronization object; and
associating the concurrency type information with the concurrency object.

14. The computer-readable storage medium of claim 13, wherein the concurrency object is configured to control concurrent executions.

15. The computer-readable storage medium of claim 13, wherein an indication that the concurrency object is a lock object indicates that the concurrency object is configured to enforce a locking protocol without a specific ordering constraint.

16. The computer-readable storage medium of claim 13, wherein an indication that the concurrency object is a synchronization object indicates that the concurrency object is configured to enforce an ordering relationship between two execution contexts.

17. The computer-readable storage medium of claim 13, wherein the method further comprises:
performing a race detection process using the concurrency type information.

18. The computer-readable storage medium of claim 13, wherein the method further comprises:
performing a wait on the concurrency object using an API call that does not identify whether the concurrency object is a lock object or a synchronization object.

19. The computer-readable storage medium of claim 18, wherein the method further comprises:
examining the concurrency type information to determine a concurrency type of the concurrency object; and
providing information to a race detection process based on the examined concurrency type information.

20. A method of automatically classifying a concurrency object for a race detection process, comprising:
intercepting an application programming interface (API) call that is configured to create the concurrency object;
identifying concurrency type information for the concurrency object based on the call, the type information indicating whether the concurrency object is a lock object or a synchronization object;
associating the concurrency type information with the concurrency object;
performing a race detection process using the concurrency type information; and
wherein the intercepting, identifying, associating, and performing are performed by at least one processor.

* * * * *